Sept. 30, 1969   E. S. JOHANSON   3,470,093
OSMOTIC PURIFICATION OF SOLUTIONS
Filed Nov. 9, 1966
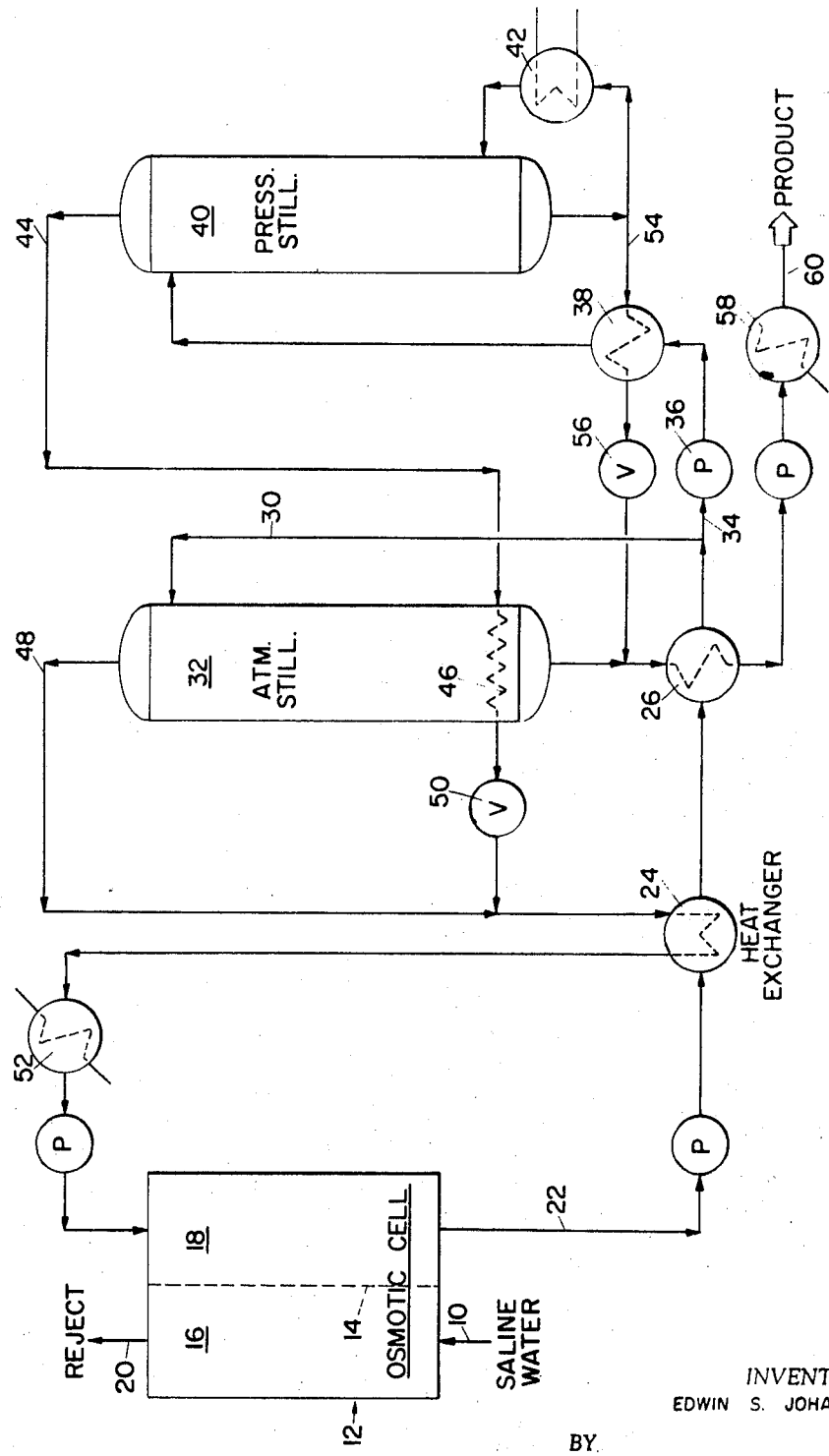
INVENTOR.
EDWIN S. JOHANSON
BY
Nathaniel Ely
ATTORNEY United States Patent Office 3,470,093
Patented Sept. 30, 1969

3,470,093
OSMOTIC PURIFICATION OF SOLUTIONS
Edwin S. Johanson, Princeton, N.J., assignor to Hydrocarbon Research, Inc., New York, N.Y., a corporation of New Jersey
Continuation-in-part of application Ser. No. 324,385, Nov. 18, 1963. This application Nov. 9, 1966, Ser. No. 611,187
Int. Cl. B01d *13/00, 11/04*
U.S. Cl. 210—22           2 Claims

ABSTRACT OF THE DISCLOSURE

An osmotic process for the recovery of water from an aqueous solution containing non-volatile impurities wherein the diffusion potential for the osmosis is obtained by diluting the diffused water side of the membrane with a solvent possessing a high volatility with respect to water and which is completely miscible with the water whereby a continuous flow of pure water is maintained through the membrane.

---

This application is a continuation-in-part of my application, Ser. No. 324,385, filed Nov. 18, 1963, and now abandoned.

This invention relates to purification of water solution by osmosis and more particularly relates to the desalination of water.

As is known, osmosis is a type of selective diffusion which proceeds through a semipermeable membrane between two solutions of unequal concentrations of the diffusable component, and tending to equalize the concentrations in the two solutions. The net movement in osmosis is the diffusion of diffusable component in the direction of lower thermodynamic potential.

It is proposed, however, that such an operation will be advantageous in the purification of water solutions despite the loss of the modynamic potential, since the diffused water can then be contained in a solution containing any advantageous constituents desired, with advantages in a subsequent purification operation.

My invention broadly is thus drawn to the relative diffusion of water through a semipermeable membrane in the nature of osmosis whereby the concentration of non-volatile materials may be increased on one side of the membrane as the liquid diffuses into the solution on the other side.

More specifically, I propose continuous transfer of water through an osmotic cell, preferably of the counterflow type wherein a thermodynamic potential equivalent to that used in a superatmospheric osmotic process is obtained by the use of a liquid which is completely miscible but more volatile than water, is readily condensible, and otherwise available for ready heat recovery.

Further objects and advantages of my invention will appear from the description hereinafter set forth when taken in connection with the drawing attached hereto in which the figure is a diagrammatic representation of a water purification process as a preferred form of embodiment of my invention.

In the drawing, a saline water stream 10 containing as an example, in the order of 3.5 weight percent of dissolved solids, is fed into one or more osmotic cells 12 preferably of the counterflow type having a suitable membrane 14 tending to divide the cell into chambers 16 and 18. As is well known, the water will diffuse through the membrane 14 and the more concentrated impurities discharge at 20 when a lower thermodynamic potential for water exists in chamber 18 than in chamber 16.

The use of osmosis in water purification has depended on the establishment of a superior potential energy as by a superatmospheric pressure in a cell such as 16 to establish any flow of water, free of salt, into chamber 18. It has been found that a pressure differential of 1000–1500 pounds per square inch is necessary for a commercially feasible process. Such a process, requiring as it does, vast amounts of power, and bulky high pressure installations, has thus far made osmosis a noncompetitive process for desalination of water as compared to multiple stage evaporation or even crystallization.

I am aware of this need for a superior thermodynamic driving force and in accordance with my invention, I establish this differential by using a completely miscible liquid for dilution of the water on the diffusion side of the membrane. While many solvents will undoubtedly be considered to have some advantage, within the scope of my invention, certain selected features of such solvents are considered essential, e.g., high volatility, high rate of evaporation and the ability to decrease the activity of the diffused water sufficiently to impose a diffusion potential equivalent to those obtained in a superatmospheric osmotic process. For the following description of a water desalination process, I find acetone to be illustrative of a preferable material.

As will hereinafter be apparent, I propose to include a concentration of acetone in the water entering the chamber 18 and containing in the order of 40 mol percent acetone. This solution tends to draw the water from chamber 16 and the discharge in line 22 contains in the order of 3 mol percent of acetone. The diffusion potential produced in this process is equivalent to that obtained in a superatmospheric osmotic process having a pressure differential of 1100 p.s.i. This solution is then heated in heat exchanger 24 and again in exchanger 26 to a temperature corresponding to its atmospheric boiling point of 176° F. Approximately 42% is then passed by line 30 into the top of atmospheric distillation tower 32. The balance (38%) in line 34 is then pumped at 36 to approximately 50 p.s.i.g. and further heated at 38 to its boiling point of 268° F. and introduced to the pressure distillation tower 40.

The pressure distillation tower 40 may be suitably heated as by steam in the reboiler 42 to vaporize the bottom liquid which is fractionated to remove a 37.5 mol percent acetone vapor overhead in line 44. This vapor condenses between 268° F. and 232° F. and thus can be used to generate vapor (reboil) the atmospheric tower 32 by means of exchanger 46. In turn, the overhead 48 of the low pressure (atmospheric) tower 32 now has a concentration of 45 mol percent of acetone. This is combined with the overhead 44 from the high pressure tower 40, after passing through expansion valve 50. The temperature of the mixed stream is such that it may be used to heat the dilute solvent solution from cell 18 in heat exchanger 24, after which it may be water cooled at 52 and introduced into chamber 18 of the osmotic cell 12.

The water bottoms 54 from the pressure distillation tower 40, after passing through heat exchanger 38 and expansion valve 56, is combined with the water bottoms from the atmospheric distillation tower 32, further cooled in heat exchanger 26 and exchanger 58 becoming the cooled relatively pure product 60. This stream contains less than 1 p.p.m. of acetone and no salt.

It will thus be apparent that a brine solution containing 3.5 weight percent dissolved solids which is equivalent to an ionic concentration of 2.2 ions/100 moles of water, is stripped of water into an acetone solution containing a final concentration of 3 mol percent of acetone.

By simple fractionation, the acetone is separated from the water to give a purified water stream containing less than 1 p.p.m. of acetone and the rich stream containing 40 mol percent of acetone.

The fraction of water removed from the original brine is limited by engineering considerations (size and number of cells, surface, and surface area of membrane) but will exceed 50% in a counterflow osmotic cell. Any membrane which exhibits selective retention of strong ions may be used as, for example, cupric ferrocyanide colloidal films for which extensive osmotic pressure data have been obtained.

The heat economy of my process with two distillation stages and with practical amounts of heat transfer surface is superior to that of multiple stage flash evaporators.

Other low boiling liquids could be substituted for acetone such as methyl alcohol, ethyl alcohol, tertiary butyl alcohol but these are somewhat inferior to acetone because of low relative volatility. Solvents which are non-miscible in water such as methyl ethyl ketone do not possess the ability to decrease the activity of the diffused water sufficiently to impose the diffusion potential required for an economically feasible process.

The table compares the activation of aqueous saline, methyl ethyl ketone and acetone solutions with changes in the percent of water diffused through the membrane:

TABLE.—COMPARISON OF ACTIVITY OF WATER IN SALINE OR ORGANIC SOLUTION WITH INCREASED OSMOTIC DIFFUSION

| | Activity of water in solution | | |
|---|---|---|---|
| Percent water | Saline, 3.5 W percent to 6.8 W percent | Methyl ethyl ketone, 61 M percent to 3.5 M percent (two phase) | Acetone, 45 M percent to 3 M percent |
| 0 | 0.958 | 0.950 | 0.809 |
| 20 | 0.966 | 0.950 | 0.909 |
| 40 | 0.971 | 0.950 | 0.939 |
| 60 | 0.979 | 0.960 | 0.956 |
| 80 | 0.976 | 0.967 | 0.966 |
| 100 | 0.978 | 0.972 | 0.972 |

As can be seen, the acetone due to its infinite solubility in water, has a significantly greater effect on the activity of the water than does the non-miscible solvent. This results in a higher driving force across the membrane.

Whereas the driving force in the acetone example would be equivalent to a pressurized osmotic process utilizing an imposed pressure of 1100 p.s.i., that for the methyl ethyl ketone would be only 700 p.s.i.

Approximately an 18–20% reduction in cost of water produced over any known osmotic or evaporative desalination process is realized by my invention.

I claim:
1. In an osmotic process for the recovery of water, free of non-volatile impurities, from an aqueous solution containing such impurities the passage of which impurities is impeded by a semipermeable membrane and wherein a diffusion potential equivalent to that obtained with a 1000–1500 p.s.i. pressure differential superatmospheric osmotic process is maintained, the improvement which comprises:
   (a) continuously feeding a completely miscible rich acetone solvent having a lower boiling point than the water and being readily condensible at normal ambient temperatures to the diffused water side of the membrane to produce a diffused water solution of lower thermodynamic potential than the thermodynamic potential of the impurity containing water side whereby impurity free water will diffuse through the membrane;
   (b) continuously removing said diffused water solution from said membrane whereby said dilution ratio is maintained;
   (c) recovering said solvent from said diffused water solution by heating, flashing and distillation of said water solution to produce a recovered water free of non-volatile solvents and said solvent for recycle to said diffused water zone;
   (d) recovering in part in a low pressure still a highly concentrated solution of acetone from said solvent (step c);
   (e) further distilling said recovered water (step c) in a pressure still to produce vaporized acetone solution;
   (f) passing said vaporized acetone solution in heat exchange with the diffused water in the atmospheric distillation zone to serve as the heating medium therefor; and
   (g) mixing said acetone solution with the concentrated acetone solution from the atmospheric distillation zone and using said combined acetone solutions for the recycle to the diffused water.

2. The method of decreasing the salinity of water as claimed in claim 1, wherein the completely miscible solvent is a rich solution of acetone (35 to 40 mol percent) and which passes in counterflow to the entering saline water and is removed as a concentration of approximately 3 mol percent.

References Cited

UNITED STATES PATENTS

| 3,088,909 | 5/1963 | Davison et al. | 210—22 |
| 3,171,799 | 2/1965 | Batchelder | 210—22 |
| 3,216,930 | 11/1965 | Glew | 210—22 |

REUBEN FRIEDMAN, Primary Examiner

FRANK A. SPEAR, Jr., Assistant Examiner

U.S. Cl. X.R.

210—321